3,118,813
ANTIBIOTIC AND METHOD OF PRODUCTION
Julius Berger, Passaic, and Moses Wolf Goldberg, Upper Montclair, N.J., Marcel Müller, Reinach, Basel-Land, Switzerland, and Leo Henryk Sternbach, Upper Montclair, N.J.
Filed Aug. 2, 1962, Ser. No. 214,243
3 Claims. (Cl. 167—65)

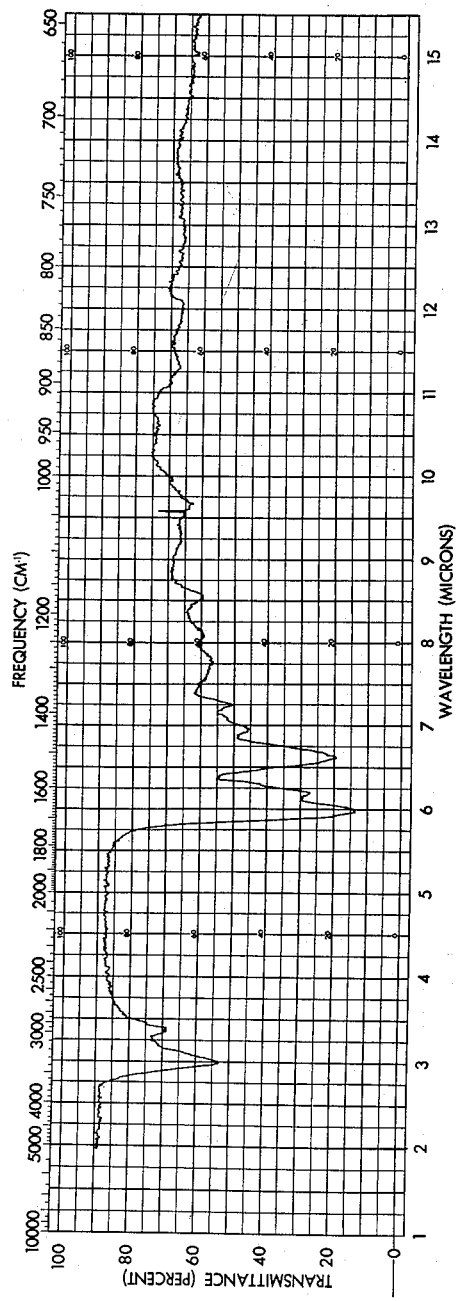

This invention relates to a new antibiotic and to a method for its production. The new antibiotic, designated as X–5079C or Ro 2–7758, is produced by a culture belonging to the genus Streptomyces. The organism, named *Streptomyces saraceticus* (also designated Streptomyces nov. sp. X–5079, was isolated from a soil sample obtained in Nutley, New Jersey. A culture of *Streptomyces saraceticus* has been deposited in the collection of microorganisms of the U.S. Department of Agriculture, Northern Utilization Research and Development Division, Peoria, Ill., under the Registration No. NRRL 2831.

The new antibiotic is readily differentiated from any known substance by its combination of the following properties:

(a) Very narrow in vitro antimicrobial spectrum.
(b) High systemic in vivo activity against *Histoplasma capsulatum*, coupled with low toxicity.
(c) High solubility in water of its sodium salt.
(d) Polypeptide nature, and sulfur content of about 13.7%.

*Streptomyces saraceticus* was isolated from the soil sample by the usual bacteriological procedures for isolation of pure cultures. The microorganism is aerobic, mesophilic and characterized by growth in the form of a much branched mycelium, with the aerial mycelium generally being white, then turning to light grey and dark grey. In some strains, vegetative mycelium becomes black. Spores are borne in chains in aerial hyphae with much spiral formation.

Cultures of *Streptomyces saraceticus* grown on favorable media such as tomato-oatmeal agar at 28° C. for 3 to 8 days show dense, well developed mycelial growth. The hyphae form branches with considerable spiral formation. Sporophores are spiral, either loosely pressed together or compact; some are stretched out or just wavy. The average number of loops per coil is 8 to 13. Coils are borne off aerial hyphae singly or in multiples (2 to 4) at the terminal ends. Spores occur in chains and are spherical (0.8–1.0 micron in diameter) or oval (0.8 x 1.2 microns). Hyphae are 0.8–1.0 micron in diameter while sporophores are 0.9–1.2 microns. Coils vary from 2.5 to 5 microns in diameter; 4 to 13 looped coils range from 9.5 to 30 microns in length.

To provide a basis for comparison of *Streptomyces saraceticus* with known Streptomyces described on classical complex nitrogenous media, as well as on chemically defined media [Pridham and Gottlieb, J. Bact. 56, 107–115 (1948)], both types of media were used. Media and procedures were adapted from those described by Pridham and Gottlieb, A Manual of Methods for Pure Culture Study of Bacteria by the Committee on Bacteriologic Technic of the Society of American Bacteriologists, 1948, and by Waksman, the Actinomycetes (Chronica Botanica Co., 1950).

The growth responses of *Streptomyces saraceticus* on various media are described below:

*Tomato-oatmeal agar.*—Vegetative growth good; slightly raised rough surface in 2 to 3 days becoming smooth and fully sporulated after 5 days, mouse grey. Aerial mycelium—good—velvety grey to mouse grey.
$H_2S$ *production.*—Negative.
*Tyrosinase reaction.*—Moderately positive.
*Skim milk.*—Ring formed at surface, cream colored with pronounced pink tinges; coagulation and peptonization; practically no change in pH; very slight tan pigment secreted.
*Blood agar (defibrinated horse blood).*—No hemolysis.
*Nutrient agar.*—Good growth, deep into medium; surface coarse to wrinkled; aerial mycelium white; reverse pale orange yellow with few dark brown spots.
*Starch agar.*—Good growth, powdery; aerial mycelium grey to mouse grey, or grey with white edges, becoming bare and black in spots.
*Asparagine-glucose agar.*—Good growth, smooth colonies, pale drab grey aerial mycelium; reverse olive-yellow to medium brown.
*Glycerol agar.*—Good growth, deep into medium; surface drinkled and cracked, no sporulation. Vegetative mycelium sandy brown color; reverse honey-yellow to walnut brown.
*Gelatin tubes.*—Limited growth, submerged; slow liquefaction starting after 2 weeks, complete in 3 weeks; no diffusible pigment.
*Nitrate reduction.*—None or very limited on either synthetic or organic nitrate broth.
*Carbon utilization.*—All strains utilized xylose, starch, glucose, fructose, saccharose, lactose, raffinose, maltose, mannitol; four out of five strains used inositol, inulin, and arabinose. There was no utilization of rhamnose and limited or doubtful use of salicin and d-sorbitol.
*Nitrogen utilization.*—Methionine, sarcosine, arginine, taurine and betaine were used. There was only limited utilization of creatine, and none of α-aminobutyric acid.

The microorganism *Streptomyces saraceticus* has been compared with other species listed in Bergey's Manual of Determinative Bacteriology, 6th ed., 1948, as well as in later sources, and found to be different from those reported. For example, *Sterptomyces saraceticus* does not give abundant growth on Czapek agar or the pH change on litmus milk or the ball-like, very tight spiral formation of sporophores given by Streptomyces sp. A158. *S. saraceticus* does not reduce nitrates like *S. albus*. It does give fair growth on inositol and good growth on lactose, whereas *S. endus* gives no growth on inositol and only poor growth on lactose.

In shaken flask culture, *Streptomyces saraceticus* grows well on many nitrogen sources, such as soybean flour, cottonseed meal, peanut protein meal, fishmeal, wheat germ flour, meat flour, peptones (thiopeptone, thiotone, pork heart digest), dried torula yeast, dried brewers' yeast, dried beef blood, distillers' dried solubles, cornsteep liquor concentrate, linseed soil meal, casein hydrolyzate, etc. On synthetic media, the single amino acids alanine, arginine, glutamic acid, lysine and valine supported good growth. Many carbon sources may be utilized for growth, such as glucose, sucrose, starch, dextrin, etc. The best medium for antibiotic production, however, contains 2% soybean flour, 2% brown sugar, 0.5% cornsteep liquor concentrate, 0.1% $K_2HPO_4$ and lard oil as antifoam agent.

The effect of various nitrogen sources on the production of antibiotic in shaken flasks is shown in the table below. In these experiments, there was used a basal medium containing 2% brown usgar, 0.5% cornsteep liquor and 0.1% K₂HPO₄. To the basal medium were added the nitrogen sources indicated in the table. The media were inoculated with a strain of *Streptomyces saraceticus* and cultured in shaken flasks at 28° C. for 6 days with the following results:

TABLE I

*Effect of Nutrient Ingredients on Antibiotic Production*

| Addition to basal medium: | P. varioti units/ml. whole broth |
|---|---|
| 2% soybean flour (Soyalose No. 103, Glidden) | 52 |
| 2% alpha protein (from soyflour, Glidden) | 57 |
| 1% protein peanut oil meal, 1% distillers' dried solubles, 1% meat meal digest (Armour) | 46 |
| 2% dried corn fermentation solubles with grain (Soluferm, Commercial Solvents Corp.) | 28 |
| 2% fish meal (menhaden) | 29 |
| 2% protein peanut meal (Planters) | 50 |
| 3% distillers' dried solubles (Schenley Soludri) | 38 |
| 2% cottonseed extracts | 33 |
| 2% linseed oil meal | 34 |
| 3% ground distillers' malt | 29 |
| 2% white wheat flour, 1% oatmeal | 24 |
| 2% powdered potato and peel, 1% powdered beet leaves, 1% dried beef serum | 56 |

In order to assay the fermentation broths for antibiotic production, a cup-plate agar diffusion method, similar to the classical penicillin assay, was used except that the 4 ml. layer of seed agar contained a heavy suspension of spores of the mold *Paecilomyces varioti*. Plates were incubated at 35° for 18 hours as a rule, but sometimes for 42 hours to get sharper zones. One unit of activity was assigned to that amount of antibiotic which, when dissolved in 1 ml. of water, produced a 20 mm. inhibition zone on the mold assay plate. Calculations of potency of unknowns were then made from a curve derived from many assays in which the diameter of inhibition zones in millimeters was plotted against concentration of antibiotic. The units in Table I are derived by the assay described above.

The antibiotic produced by *Streptomyces saraceticus* is particularly distinguishable because of its very narrow in vitro antimicrobial spectrum. It is inactive against yeasts such as *Saracharomyces cerevisae, S. Carlsbergensis, Kloeckera brevis, Candida albicans, Torula cremoris, T. utilis, T. rosea, Hansenula saturns, H. anomola, Pichia chodata, P. membranescacius, Zygosaccharomyces saturnus, Z. barkevi, Z. bisporus, Schizosaccharomyces pombe, Schizo, octosporus, Debaryomyces tyrocola* and *D. globosus*. Although a number of other fungi in addition to *Paecilomyces varioti* show sensitivity in vitro to the new antibiotic on agar assay plates, none of those tested (*Penicillium digitatum, P. citrinum, Aspergillus flavus, A. niger, Alternaria solani, Fusarium oxysporum, Rhizopus nigricans, Botrytis paeoniae, Helminthosporium inequale, Histoplasma capsulatum*) is nearly as sensitive as *P. varioti*, nor do they give as satisfactory inhibition zones.

Antibiotic X–5079C is inactive in agar cup-plate tests against the following bacteria: *Escherichia coli, Mycobacterium phlei, Bacillus simplex, Sarcina lutea, Corynebacterium simplex, Streptomyces cellulosae, B. subtilis, Azotobacter vinelandii, Staphylococcus aureus,* Bodenheimer's bacillus, *Proteus vulgaris, Pseudomonas aeruginosa, Pseudomonas ovalis, Alcaligenes faecalis, Aerobacter areogenes, Lactobacillus lactis, B. adhaerans, B. cereus, B. megatherium, Staphylococcus albus* and *Streptococcus faecalis.*

*Streptomyces saraceticus* is maintained on the following medium: 2% soybean flour, 2% brown sugar, 0.5% cornsteep liquor, 0.1% K₂HPO₄ and 1.5% agar, in tap water. It permits excellent growth and sporulation. When used in agar plates, it is very satisfactory for isolation of variants.

The inoculum for flask or large bottle fermentations is prepared by suspending some of the spores from an agar slant in water. This water suspension of spores is then added to the nutrient medium in flasks or bottles. Fermentation in 500 ml. Erlenmeyer flasks containing 100 ml. of liquid medium is carried out at 23° to 30° C. on rotary or reciprocating type shaking machines for 2 to 6 days.

Inoculum for tank fermentations is prepared in 5 gallon bottles or in 6 liter shaken flasks containing a suitable medium, such as 0.5% soybean flour, 1% brown sugar, 0.5% cornsteep liquor, 0.1% K₂HPO₄ and about 0.2% lard oil as antifoam, which is aerated and fermented for 2 to 6 days at 23° to 30° C. Alkali is added to the medium before autoclaving so that after sterilization the pH is about 6 to 7. One to ten gallons of vegatative growth are used as inoculum per 100 gallons of fermentation medium. The latter contains 2% soybean flour, 2% brown sugar, 0.5% cornsteep liquor and 0.1% K₂HPO₄, with lard oil as antifoam. Glass lined tanks or stainless or carbon steel tanks fitted for constant aeration and agitation may be used to prepare 50 to 2500 gallon batches of fermented broth.

The optimum fermentation time for maximum antibiotic yield depends on a number of factors, such as the composition of the medium, the amount of inoculum, the degree of aeration or agitation, etc. On the preferred medium described above, peak yields are generally obtained in 4 to 6 days in flasks and 3 to 4 days in tanks. Antibiotic production from *Streptomyces saraceticus* does not require a high rate of aeration. The same yield is produced over a reasonable range of air suppply. Similarly, a moderate amount of agitation is all that is required, depending upon the size and shape of the tank, the type of air sparger, the speed and type of agitator and the amount of baffling within the tanks. The optimum air flow should be in the range of 1 to 10 cu. ft. per minute per 100 gallons of broth and agitation at about 90 to 150 r.p.m.

The temperature of incubation may vary between 23° and 34°, but 24° to 28° constitutes a preferred range. It has been found that the pH of the medium should be adjusted within the range of about 5.8 to 7.5. This may be effected by the addition of potassium hydroxide solution prior to sterilization. During a 4 to 5 day fermentation period in flasks or tanks, the pH generally rises to about 7.5.

The antibiotic fermentation in tanks is generally accompanied by considerable foaming during aeration. It has therefore been found desirable to add an antifoam agent. Any of a variety of antifoam agents may be used, e.g., soybean oil, silicone antifoam, etc. Lard oil has been found in general to give the best results. 0.1% to about 3% by weight of medium may be used.

The antibiotic X–5079C may be extracted from the whole broth or separately from the mycelial growth and the filtered broth. Filtered broth, for example, is extracted with a half volume of a water immiscible alcohol solvent such as butanol.

Wet mycelial growth may be extracted with a lower aliphatic alcohol such as methanol, ethanol or butanol. A preferred method is to acidify the whole broth, which accelerates filtration and precipitates the antibiotic almost quantitatively onto the mycelium. The antibiotic may then be extracted from this with an alcohol. The cells may then be discarded and the extract may be washed with water before concentration at a temperature below 45° C. The concentrate is precipitated with a hydrocarbon solvent and filtered. The crude precipitated antibiotic is then air-dried.

The antibiotic may be further purified by treating the crude material in methanol with aluminum oxide, which adsorbs some impurities. Purification can also be achieved by extracting the antibiotic from a butanol solution with aqueous alkali, acidifying the alkaline solution and extracting the antibiotic with butanol. The antibiotic can also be purified by chromatography in methanol on a column of basic aluminum oxide. Instead of using aluminum oxide, the mixture may also be purified by chromatography on a silica gel distribution column, or a water containing diatomaceous earth distribution column, using butanol saturated with water as the mobile phase. For the preparation of highly purified material a combination of two or more of the above outlined steps can be used.

The purified antibiotic obtained from *Streptomyces saraceticus* is an amorphous white powder which has no distinct melting point, darkens at about 220°, browns at 250° and chars at about 270 to 280°. It shows the following elementary analysis: C, 46.2±0.4; H, 4.9±0.3; N, 16.0±0.6; S, 13.7±0.3; Na, 2.0±0.5. The specific optical rotation $[\alpha]_D^{25}$ is +40° to +42° (c.=1.0 in water). The molecular weight is 14,000±1,200, as determined by sedimentation and diffusion rates in the ultracentrifuge.

The bioassay of the purified antibiotic is 300±15% *Paecilomyces varioti* units per mg. The free antibiotic, i.e., having free acid groups, is isolated by treatment of an aqueous solution of its sodium salt with an ion exchange resin containing sulfonic acid groups in the acid form. The free antibiotic precipitates as a fine suspended powder. The suspension is decanted off from the resin, filtered, and dried. The free antibiotic, however, is unstable at its own pH and is therefore preferably isolated as a salt. The free antibiotic has the composition: C, 47.1±0.6; H, 5.1±0.3; N, 16.3±0.7; S, 14.0±0.4, calculated from the above sodium salt. The present invention relates to the free antibiotic, and to its salts, particularly its alkali metal and alkaline earth metal salts.

When acidified (pH 3–4), the antibiotic is fairly soluble in methanol and water-saturated butanol. It is only slightly soluble in water and acetone, insoluble in ether, ethyl acetate, chloroform, benzene and hexane. At a pH between 7 and 9, the antibiotic is soluble in methanol and water, slightly soluble in n-butanol, insoluble in ether, ethyl acetate, chloroform, benzene, acetone and hexane. The compound is also soluble in pyridine.

Antibiotic X–5079C shows maxima in the ultraviolet absorption spectrum in isopropanol at 222 mμ, $$E_{1\,cm.}^{1\%} = 510$$

and at 273 mμ, $$E_{1\,cm.}^{1\%} = 245$$

The infrared absorption spectrum of this antibiotic in KBr is reproduced in the accompanying figure. It shows peaks at the following frequencies and wave lengths (with shoulders indicated by "sh."):

TABLE II

*Infrared Absorption Spectrum*

| Frequency (cm.⁻¹): | Wave length (μ) |
|---|---|
| 3320 | 3.01 |
| 2980 | 3.37 |
| 1689 | (sh.) 5.92 |
| 1668 | 6.00 |
| 1610 | 6.20 |
| 1506 | 6.63 |
| 1437 | 6.96 |
| 1379 | 7.25 |
| 1280 | 7.80 |
| 1168 | 8.57 |
| 1034 | 9.67 |

Aqueous solutions of antibiotic X–5079C are fairly stable at low temperatures at a pH between 4 and 8. The microbiological activity disappears in strongly acidic and strongly basic solutions.

The neutral equivalent of the antibiotic is 1000 to 1300 determined by electrometric titration and calculation from the content of sodium.

The antibiotic can be hydrolyzed by refluxing with 20% hydrochloric acid. Treatment of the hydrolyzate with 30% hydrogen peroxide, to convert any cysteine or cystine into cysteic acid, and then subjecting the solution to bidimensional chromatography on paper, using phenol-water (100:25) in a medium saturated with ammonia and collidine-lutidine-water (1:1:1) in a medium saturated with diethylamine, gives 8 ninhydrin positive spots. Five of these could be identified as due to cysteic acid, aspartic acid, glycine, threonine and proline. This indicates that the antibiotic is a polypeptide of high molecular weight.

Antibiotic X–5079C is useful against certain human systemic fungus infections, such as histoplasmosis and blastomycosis. In mice the purified antibiotic is characterized by a $CD_{50}$ of 2–5 mg./kg./day S.C. against histoplasmosis and a $CD_{50}$ of 8.5 mg./kg./day S.C. against blastomycosis. Such preparations are of low toxicity, the $LD_{50}$ in mice being about 375 mg./kg. I.V. Less pure preparations have also been found to be of very low toxicity and good in vivo activity.

This application is a continuation-in-part application of Serial No. 21,999, filed April 13, 1960, entitled "Antibiotic," to Julius Berger, Moses Wolf Goldberg, Marcel Muller, and Leo Henryk Sternbach, now abandoned.

EXAMPLE

Spores from the surface of an agar slant of a strain of *Streptomyces saraceticus* were suspended in water and inoculated into 6 liter Erlenmeyer flasks, each containing 3 liters of medium consisting of 2% soybean flour, 2% brown sugar, 0.5% cornsteep liquor and 0.1% $K_2HPO_4$. The inoculum was incubated on a rotary shaker at 210 r.p.m. and 28° C. for 3 days.

A 300 gallon steel tank was charged with 200 gallons of medium containing 2% soybean flour, 2% brown sugar, 0.5% cornsteep liquor, 0.1% $K_2HPO_4$ and 0.2% lard oil as antifoam. After sterilization, the tank was inoculated with two of the flasks of inoculum prepared as described above and incubated at 26 to 28° C. under constant agitation and aeration for 4 days. The air flow was 10 cu. ft. per minute for the first day and 15 cu. ft. per minute thereafter.

A 4200 gallon carbon steel tank charged with 2200 gallons of the same medium used in the seed tank described in the immediately preceding paragraph was inoculated with 200 gallons of the growth from the seed tank. A total of 2–5 gallons of lard oil were added during the fermentation. After 4 days growth at 26–28° C., with aeration of 75 cu. ft. per minute and constant agitation, the batch was flocculated by the addition of 50 lbs. of aluminum sulfate and acidified to pH 4 with about 6 liters of syrupy phosphoric acid. The broth was filtered in a rotary drum filter using approximately 1,000 lbs. of diatomaceous earth as a filter aid. The filtrate was discarded and the damp cells, after further drying in a basket centrifuge, were extracted with about 300 gallons of butanol. The suspension was centrifuged and the partially emulsified solvent extract was clarified in a supercentrifuge. The filtered extract (about 300 gallons) was then evaporated under reduced pressure at a temperature not exceeding 45° C. to about 10 gallons. This was then precipitated with about 20 gallons of Skellysolve B and, after standing overnight, the solid material was filtered off, washed with more Skellysolve B and air dried.

3 kg. of crude antibiotic obtained as described above was dissolved in 35 liters of methanol. To this solution 6 kg. of basic aluminum oxide was added and the mixture was stirred for ½ hour. It was then filtered and the filter cake was washed with 5 liters of methanol. The filtrates were combined, then concentrated in vacuo to 6 liters and diluted with 18 liters of a 1:1 mixture of acetone-Skellysolve B. The precipitated material was filtered off. It formed 1.4 kg. of a light brown solid. This material was mixed with 7 liters of water and 7 liters of butanol. The mixture was stirred and the pH was adjusted to 7.5 by addition of 3 N sodium hydroxide. The water layer was then separated and the butanol layer was extracted 3 more times with 2 liters of water each time.

The aqueous layers containing most of the antibiotic were combined, acidified to pH 3.5 with 75% phosphoric acid and extracted once with 7 liters and then 3 times with 3 liters of butanol. The combined butanol extracts were neutralized (pH 7) with dilute aqueous sodium hydroxide and concentrated in vacuo to about 12 liters. To this concentrate was added 24 liters of a 1:1 mixture of acetone and Skellysolve B. The precipitated tan powder was filtered off, suspended in one liter of water, which dissolved most of the solid, and mixed with 1.5 kg. of diatomaceous earth.

The moist powder thus obtained was suspended in about 3 liters of water-saturated butanol and put on top of a distribution column. This column was made up by mixing 4.5 kg. of diatomaceous earth with 3 liters of water and suspending this mixture in water-saturated butanol. The column was eluted with about 100 liters of water-saturated butanol. The eluate was collected in fractions of about 2 liters. Each fraction was tested microbiologically by means of the in vitro antifungal plate assay. Finally ten fractions which had about equal potency were combined and concentrated in vacuo to a small volume. During the concentration, some of the material precipitated out. An excess of Skellysolve B was added to the fractions. The material was precipitated as a fine tan powder which was filtered off and washed with Skellysolve B.

80 g. of the most active fractions were dissolved in 2 liters of methanol and put on a column prepared with methanol and 1.2 kg. of basic aluminum oxide which was deactivated by the addition of 15% of water. Methanol was used for the elution. One liter fractions were taken, concentrated in vacuo and then precipitated with acetone-Skellysolve B. The precipitated material was filtered off and dried over phosphorus pentoxide to obtain an almost white powder.

The product had the physical characteristics described above; it was active in vivo against histoplasmosis in mice with a $CD_{50}$ of 3.5 mg./kg./day S.C.

We claim:

1. A process for producing an antibiotic from the organism *Streptomyces saraceticus* which comprises cultivating *Streptomyces saraceticus* under submerged aerobic conditions in an aqueous nutrient medium containing inorganic salts and an organic carbon and nitrogen source for about 2 to 6 days at a temperature of about 24 to 28° C. until substantial antifungal activity is imparted to said medium and recovering the antibiotic from the fermentation broth.

2. A process as in claim 1 wherein the antibiotic is recovered by extracting the mycelial growth with a lower aliphatic alcohol.

3. A sodium salt of an antibiotic, said sodium salt having the following elementary analysis: C, 46.2%; H, 4.9%; N, 16.0%; S, 13.7%; Na, 2.0%, being a polypeptide of 14,000 molecular weight, acidic in character, having a specific optical rotation in water $[\alpha]_D^{25}$ of +40—42°, being soluble in methanol and water, slightly soluble in n-butanol, insoluble in ether, ethyl acetate, chloroform, benzene, acetone, and hexane, having no distinct melting point, darkening at about 220° C., exhibiting absorption peaks in KBr in the infrared spectrum at the following frequencies expressed in reciprocal centimeters: 3320, 2980, 1689, 1668, 1610, 1506, 1437, 1379, 1280, 1168 and 1034; upon acid hydrolysis and treatment of the hydrolyzate with hydrogen peroxide giving a hydrolyzate comprising cysteic acid, aspartic acid, glycine, threonine and proline; having a narrow in vitro antimicrobial spectrum, being inactive against the yeasts *Saccharomyces cerevisiae*, *S. carlsbergensis*, *Kloeckera brevis*, *Candida albicans*, *Torula cremoris*, *T. utilis*, *T. rosea*, *Hansenula saturnus*, *H. anomola*, *Pichia chodata*, *P. membranesacius*, *Zygosaccharomyces saturnus*, *Z. barkevi*, *Z. bisporus*, *Schizosaccharomyces pombé*, *Schizo. octosporus*, *Debaryomyces tyrocola* and *D. globosus*, active against *Paecilomyces varioti*, inactive in agar cup-plate tests against the bacteria *Escherichia coli*, *Mycobacterium phlei*, *Bacillus simplex*, *Sarcina lutea*, *Corynebacterium simplex*, *Streptomyces cellulosae*, *B. subtilis*, *Azotobacter vinelandii*, *Staphylococcus aureus*, Bodenheimer's bacillus, *Proteus vulgaris*, *Pseudomonas aeruginosa*, *Pseudomonas ovalis*, *Alcaligenes faecalis*, *Aerobacter aerogenes*, *Lactobacillus lactis*, *B. adhaerans*, *B. cereus*, *B. megatherium*, *Staphylococcus albus* and *Streptococcus faecalis*, and active in vivo against histoplasmosis and blastomycosis.

No references cited.